Aug. 4, 1953 W. CARMICHAEL 2,647,604
CENTRIFUGAL CLUTCH WITH QUICK ACTUATOR
Filed Sept. 14, 1951
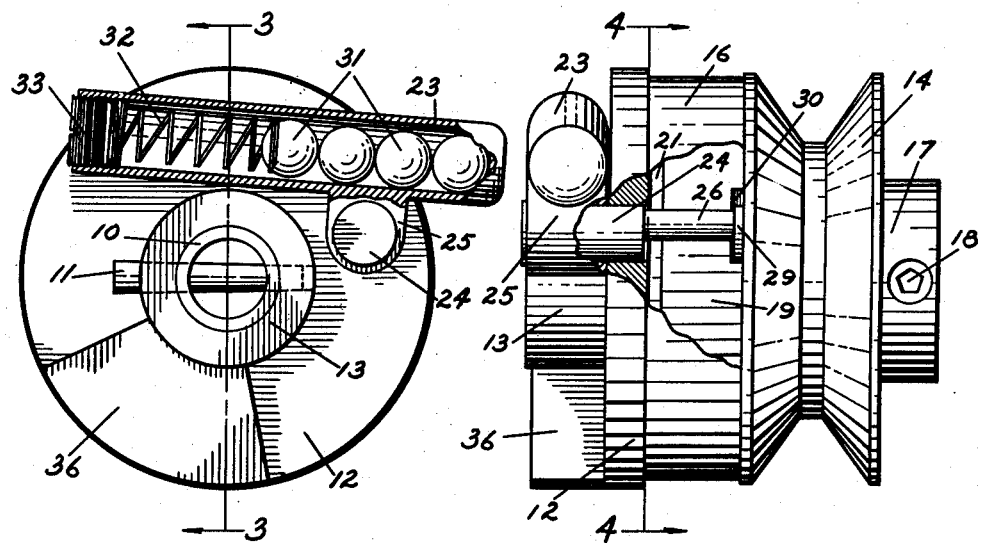
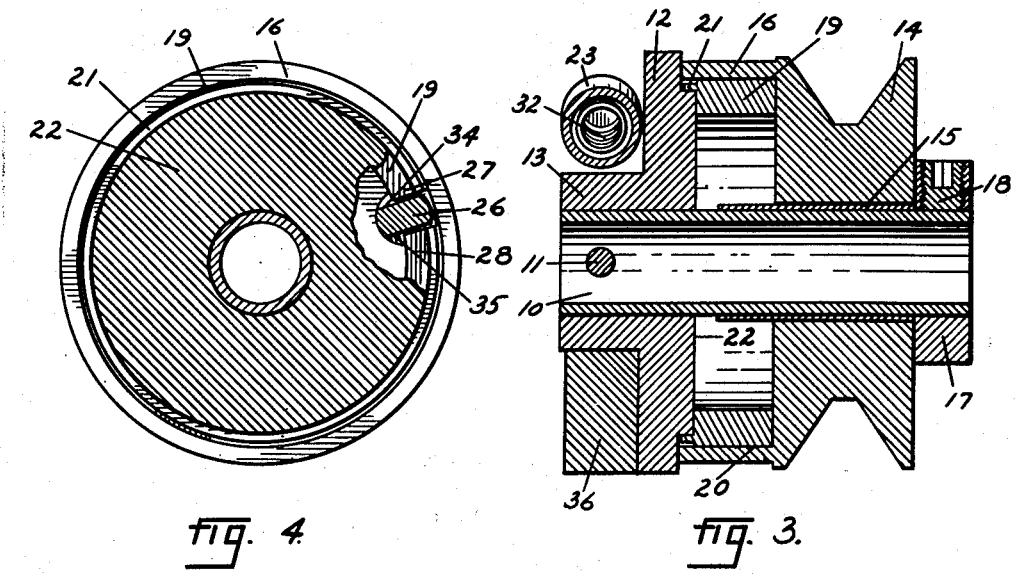
INVENTOR,
WILLIAM CARMICHAEL,
By Hubert A. Venture
ATTORNEY.

Patented Aug. 4, 1953

2,647,604

UNITED STATES PATENT OFFICE 2,647,604

CENTRIFUGAL CLUTCH WITH QUICK ACTUATOR

William Carmichael, Knightsville, Ind.

Application September 14, 1951, Serial No. 246,590

3 Claims. (Cl. 192—105)

This invention relates to a clutch which is operated by differentials in speed of a driving member through a member shiftable under centrifugal force in accordance with the differences in speed to interconnect and disconnect a driven member with and from the driving member.

A particular advantage of the present invention resides in the fact that the centrifugally shifting member operates to give a quick engagement and a quick release between the two clutch members so that the driven member is interconnected with the driving member at very closely predetermined speeds, and is accordingly released without undue drag at the critical releasing speeds.

A further important object of the invention is to provide an exceedingly simplified structure with a minimum of operating parts and which structure would be operable over a long period of usage without the necessity of replacing any of the engaging or disengaging members.

Further important objects and advantages of the invention will become apparent to those versed in the art in the following description of one particular form of the invention as illustrated in the accompanying drawing in which Fig. 1 is a view in side elevation and partial section of a structure embodying the invention;

Fig. 2 is a view in end elevation and partial section;

Fig. 3 is a view in longitudinal section on the line 3—3 in Fig. 2; and

Fig. 4 is a view in section on the line 4—4 in Fig. 1.

A driving shaft 10 herein shown as being tubular is suitably interconnected with the driving shaft of a motor or the like (not shown). The interconnection may be through the tapered pin 11. Fixed to the shaft 10 is a plate 12, the plate 12 having a hub 13 through which the tapered pin 11 extends to pass through the shaft 10.

A pulley 14, herein shown as of the V-type, is revolubly mounted on the shaft 10, preferably over a bushing 15 which is fixed on the shaft 10 and around which the pulley 14 is free to turn. The pulley 14 is spaced from the plate 12 by an integral drum 16 extending to the plate 12. A collar 17 is telescoped over the end of the shaft 10 to retain the pulley 14 against longitudinal travel along the bushing 15. The drum 16 has a revolving fit against the face of the plate 12. The collar 17 is secured to the shaft 10 by any suitable means, herein shown as by a set screw 18.

Within the drum 16, there is carried a split ring 19 having a peripheral surface 20 carried around the inner side of the drum 16 with a few thousandths of an inch clearance under normal condition of the ring 19. This ring 19 carries an annular flange 21 projecting towards the plate 12, and fitting around a boss 22 which extends inwardly of the drum 16. The flange 21 serves to center the ring 19 in respect to the boss 22 so that the peripheral face 20 of the ring 19 normally does not drag against the drum 16 and furthermore tends to space that peripheral face 20 evenly entirely around its circumference.

Externally of the plate 12, there is mounted a tubular housing 23 by means of a pin 24 which extends in a fixed manner through the foot 25 extending laterally from the underside of the housing 13, the pin 24 being revolubly carried through the plate 12. A flattened length 26 of the pin 24 extends between the ends 27 and 28 of the ring 19 to terminate in a head 29 which is carried in a recessed portion 30 of the two ends 27 and 28, Fig. 1. By means of the head 29 being positioned in this recess 30, the pin 24 is held against longitudinal displacement from the plate 12. The flattened length 26 serves as a cam to spread apart the ring ends 27 and 28 so as to expand the ring 19 into frictional engagement with the drum 16, when the pin 24 is revolved in relation to the plate 12.

The tubular housing 23 carries a plurality of metal balls 31, herein shown as four in number. The number may vary in accordance with the size of the overall structure. Also it may vary in accordance with the speed differential which may be desired. These balls 31 are normally held at one end of the housing 23 by means of a light spring 32 which is slightly compressed between a plug 33 carried in the entrance end of the housing 23 and the first ball 31 appearing in the housing 23. The housing 23 has its major length disposed to that side of the pin 24 to overhang the hub 13 as indicated in Fig. 2, whereas there is a slight length of the housing 23 extending in the opposite direction beyond the pin 24. In the present showing, this lesser extension of the housing 23 is such that it will carry at least one ball 31 and a portion of an adjacent ball. This relationship between the positioning of the major and minor lengths of the housing 23 in relation to the pin 24 is that which will be for a rotation of the plate 12 in a counterclockwise direction as viewed in Fig. 2. The pin 24 is, as is indicated, offset from the longitudinal axis of the shaft 10.

In operation, the plate 12 is revolved by the shaft 10 in a counterclockwise direction as viewed in Fig. 2, in which direction the end of the tube 23 carrying the plug 33 will be a leading end thereof, and the closed end will be the rear or trailing end. When the plate 12 reaches a predetermined speed in relation to the size of the housing 23 and the diameters of the weights 31 carried therein together with the pressure of the spring 32, the housing 23 will change its angular position to revolve the pin 24 with the plug end of the housing 23 tending to fly outwardly from the hub 13. The thickness of the pin length 26 between the flat faces 34 and 35 is made to be such that the pin 24 may revolve a distance before the ends 27 and 28 of the ring 19 are spread apart by that revolving. In other words, the housing 23 is free to turn somewhat prior to the exertion of the pressure between the ring ends 27 and 28 by the flattened length 26. This permits the housing 23 to have a slight initial quick outward travel upon starting up the rotation of the plate 12 so as to bring the flat faces 34 and 35 into initial contact with those ring ends 27 and 28, after which further turning of the housing 23 on the axis of the pin 24 is had only under the additional centrifugal action set up by the combined weight of the major length of the housing 23 plus the tendency of the balls 31 to travel toward the plug 33 under the centrifugal effect. This centrifugal effect may be increased in respect to the tendency of the housing 23 to revolve outwardly in respect to the plug end by adding additional ball weights 31 as may be required for the load to be driven by the pulley 14.

In any event, outward travel of the plug end of the housing 23 causes the ring 19 to be eventually expanded to that degree where it will frictionally engage the drum 16 and thus drive the pulley 14. By reason of the minor lengths of the housing 23 being carried beyond the axis of the pin 24, there is a balancing or compensating action set up so that the rocking of the housing 23 will only occur when the speed of the plate 12 produces the required centrifugal action for the ring-drum engagement. Upon slowing down of the shaft 10, such as may be produced by an overload on the pulley 14, the housing 23 will drop back toward the position as indicated in Fig. 2 so as to cause the ring 19 to release its engagement with the drum 16, and thus disconnect the drive between the plate 12 and the pulley 14.

The quick engagement and quick release of the ring 19 frictionally with the inside face of the drum 16 is produced by reason of the three factors involved, namely the carrying of one or more balls 31 toward the closed end of the tubular housing 23 to one side of the pin 24 with the remainder of the balls on the other side, all of the balls being compressibly urged toward the closed end by means of the spring 32 whose compression strength is adjustably secured by means of the plug 33; and also by reason of the fact that the flattened length 26 of the pin 24 is fitted freely between the ends 27 and 28 of the ring 19 so that there is permitted a slight initial rotative travel of the pin 24, before there is any pressure exerted tending to spread apart the ends 27 and 28 of the ring 19. The balls 31 are held toward the closed end of the housing 23 by means of a spring 32 which is specified as having a "light spring 32" to be slightly compressed by the plug 33. In other words, this is in the nature of a hair spring so that the balls 31 are normally held against travel under ordinary conditions prior to the reaching of the upper range of speed of the shaft 10 wherein the clutch engagement is to be had. Once this speed is approached, the balls 31 will tend to overcome the pressure thereagainst by the spring 32, and while there is an increasing pressure exerted as the spring 32 is increasingly compressed, yet that spring being so light will permit the balls 31 to travel rather quickly into the end of the housing toward the direction of the plug 33 to cause a quick throwout of the housing 23 itself with the corresponding quick rocking of the pin end 26. The same thing happens in reverse since the spring 32 urges those balls 31 to a quick return toward the closed end of the housing 23 rather than waiting for the full release of centrifugal action thereon. By reason of the balls, at least one and one half thereof, being adjacent the closed end of the tube 23, there will be a slight balancing effect tending to resist the centrifugal action ordinarily rocking the housing 23. This resisting action is maintained up to speeds approaching the critical speed where the clutching action is to be had.

It is further to be noted that the housing 23 is initially positioned as indicated in Fig. 2 to have its underside over the hub 13 so that it is limited in the travel in that direction. This travel is so limited that the housing 23 has its axis normally at an acute angle (in respect to the plug end), with a radius from the axis of the shaft 10 through the axis of the pin 24.

In order to provide static and dynamic balancing, it is desirable that a counterweight 36 be provided to offset the weight of the housing 23 and its contents together with the pin 24. This weight 36 will be affixed to the outer face of the plate 12 diametrically opposite the center of mass of those combined elements, the weight 36 being positioned somewhat as indicated in Fig. 2.

While I have herein shown and described my invention in the one particular form, it is obvious that structural variations may be employed without departing from the spirit of the invention, and I therefore do not desire to be limited to that precise form beyond the limitations which may be imposed by the following claims.

I claim:

1. A centrifugally operating clutch structure comprising a shaft; a driving member fixed to said shaft; a driven member revolubly mounted on said shaft; a drum carried by said driven member concentric of said shaft and open toward said driving member; an elastic split annular ring having two opposing spaced apart ends and entering said drum; an annular flange extending from and around said ring toward said driving member; a boss on said driving member entering within said flange, centering the ring within said drum; a tubular housing having a closed end; a pin rotatably carried by said driving member eccentrically of the axis of said shaft and having an inner end extending externally of said driving member; said housing being fixed to said pin intermediate its ends; a plurality of weight balls freely carried in said housing; a compression spring within the housing; a spring abutment at the other end of said housing, between which abutment and said balls said spring is compressed to urge said balls toward said closed end; said pin inner end having a cam entering between said ring ends spreading apart said ends upon turning of said pin upon its axis and increasing the external diameter of the ring to effect frictional engagement with said drum, said pin turning being induced by rocking of said housing under centrifugal action through turning of said shaft.

2. The structure of claim 1 wherein said pin inner end has substantially parallel side, flat faces, and the width of the pin between those faces is less than the normal distance between said ring ends to provide for an initial turning of said pin by said housing prior to spreading apart of said ring ends.

3. The structure of claim 1 wherein said pin inner end has substantially parallel side, flat faces, and the width of the pin between those faces is less than the normal distance between said ring ends to provide for an initial turning of said pin by said housing prior to spreading apart of said ring ends; said housing is a cylinder and has its axis positioned at right angles to and spaced apart from said pin axis; and said housing has a major length to one side of said pin in the direction of rotation of said shaft.

WILLIAM CARMICHAEL.

References Cited in the file of this patent

UNITED STATES PATENTS

| Number | Name | Date |
| --- | --- | --- |
| 723,196 | Dysterud | Mar. 17, 1903 |
| 771,771 | Dysterud | Oct. 4, 1904 |
| 882,187 | Colwell | Mar. 17, 1908 |
| 1,327,767 | Lippincott | Jan. 13, 1920 |
| 1,451,506 | Graff et al. | Apr. 10, 1923 |
| 1,837,520 | Bock | Dec. 22, 1931 |

FOREIGN PATENTS

| Number | Country | Date |
| --- | --- | --- |
| 79,835 | Sweden | Nov. 28, 1930 |